(12) United States Patent
Li et al.

(10) Patent No.: US 8,502,486 B2
(45) Date of Patent: Aug. 6, 2013

(54) DC BRUSHLESS MOTOR SYSTEM AND THE METHOD THEREOF

(75) Inventors: Yike Li, Chengdu (CN); Jian Zhao, Hangzhou (CN); Antonius Bakker, Morgan Hill, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 80 days.

(21) Appl. No.: 13/231,867

(22) Filed: Sep. 13, 2011

(65) Prior Publication Data

US 2012/0062159 A1 Mar. 15, 2012

(30) Foreign Application Priority Data

Sep. 14, 2010 (CN) .......................... 2010 1 0282612

(51) Int. Cl.
*H02P 6/00* (2006.01)
(52) U.S. Cl.
USPC .................................................... 318/400.25

(58) Field of Classification Search
None
See application file for complete search history.

(56) References Cited

U.S. PATENT DOCUMENTS

| 6,995,531 | B2 | 2/2006 | Ichimaru et al. | |
|---|---|---|---|---|
| 2002/0190673 | A1* | 12/2002 | Brenden et al. | 318/254 |
| 2004/0075407 | A1* | 4/2004 | Ohiwa et al. | 318/254 |

OTHER PUBLICATIONS

Duane Hanselman, "Brushless Permanent Magnet Motor Design", Second Edition, published Jan. 31, 2006, pp. 5-7, Magna Physics Pub., U.S.

* cited by examiner

*Primary Examiner* — Lincoln Donovan
*Assistant Examiner* — Zoheb Imtiaz
(74) *Attorney, Agent, or Firm* — Perkins Coie LLP

(57) ABSTRACT

A DC brushless motor system is disclosed. When a rotor of the DC brushless motor is close to an aligned position, there will be current spike in the coil and voltage spike in an input capacitor. By decreasing the peak current limit of the current in the coil when the rotor is close to the aligned position, the current spike and the voltage spike are reduced.

10 Claims, 8 Drawing Sheets

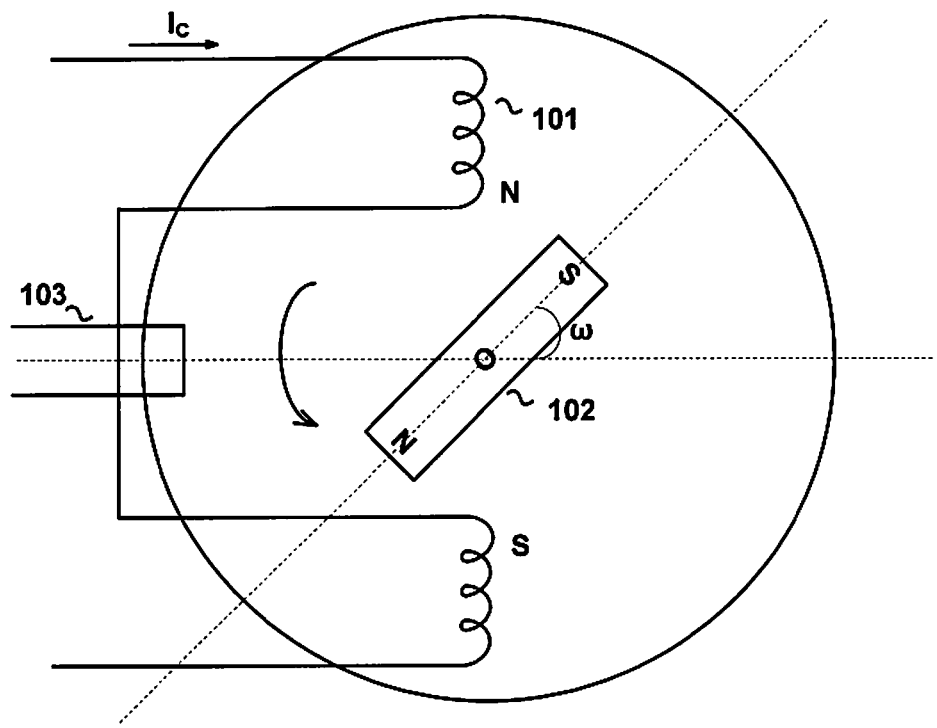
FIG. 3 *(Prior Art)*
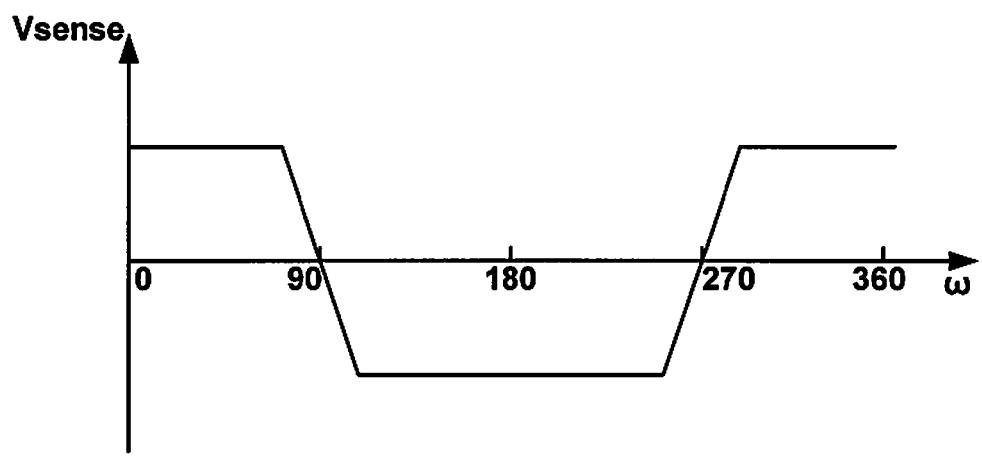
FIG. 4 *(Prior Art)*

US 8,502,486 B2

DC BRUSHLESS MOTOR SYSTEM AND THE METHOD THEREOF

CROSS-REFERENCE TO RELATED APPLICATIONS

This application claims priority to and the benefit of Chinese Patent Application No. 201010282612.6, filed Sep. 14, 2010, which is incorporated herein by reference in its entirety.

FIELD

The present disclosure relates generally to electronic circuits, and more particularly but not exclusively to brushless DC motors.

BACKGROUND

Motors are widely used in CPU fans. The motors can be classified into DC (direct current) motors and AC (alternating current) motors according to their power supply.

FIG. 1 shows a prior art DC brushless motor. The prior art DC brushless motor in FIG. 1 comprises a rotor which may be a bar permanent magnet and a stator which may be a coil. In order to sense the position of the rotor, there will be a position sensor. The position sensor may be a hall sensor. According to the right-hand rule, when the current Ic flows through the coil 101 with the direction shown in FIG. 1, there will be a electromagnetic field with an N (north) magnetic pole above and an S (south) magnetic pole below. According to the law of opposite magnet poles attract but like magnet poles repel each other, the magnetic torque generated by the electromagnetic field will force a counterclockwise rotation spin of the rotor 102.

The rotor 102 is free to rotate about its center, but is otherwise fixed. In FIG. 1, each end of the rotor 102 experiences an equal but oppositely directed radial force. ω represents the angle between the magnetic pole of the rotor 102 and the magnetic pole of the coil 101. If the rotor 102 rotates slowly, it will have the tendency to come to rest in the aligned position at ω=0° or ω=180°. That is, as the magnet rotates, it will experience a force that will try to align the rotor 102 with the magnetic pole of the coil 101 as shown in FIG. 2. When the rotor 102 is in the aligned position, there will be no magnetic torque upon the rotor 102. When the rotor passes the aligned position because of inertia, the direction of the magnetic torque upon the rotor 102 will change and the magnetic torque will force the rotor 102 to back to the aligned position if the direction of the current flowing through the coil 101 remains unchanged.

In order to keep the rotor 102 rotating with fixed direction, for example, counterclockwise, the direction of the current in the coil 101 should be changed after the rotor passes the aligned position. Normally, the direction of the current flowing through the coil 101 changes in response to the position of the rotor which is sensed by the position sensor.

FIGS. 3 and 4 schematically show how the position sensor 103 senses the relative position of the rotor 102 to the coil 101. The position sensor generates a sense signal Vsense based on the angle w. When the angle ω is between 90° and 270°, the sense signal Vsense is logical low. Otherwise, the sense signal Vsense is logical high. The direction of the current flowing through the coil 101 changes in response to the sense signal.

FIG. 5 shows an equivalent circuit model of the DC brushless motor in FIG. 1. The equivalent circuit model comprises an equivalently parasitical inductor Lp, an equivalently resistor Rp and an induced electromotive force Vt, wherein the induced electromotive force Vt is generated by the rotation of the rotor 102. According to Lenz's law, the magnitude of the induced electromotive force Vt is proportional to the product of the speed of the rotor and the variation rate dB/dt of the flux density. When the rotor 102 is close to the aligned position, the variation rate dB/dt of the flux density decreases, causing a decrease of the induced electromotive force Vt.

FIG. 6 schematically shows a DC brushless motor system which comprises a power supply and the equivalent circuit model of the DC brushless motor. The power supply may comprise a full-bridge inverter or a half-bridge inverter. In the example of FIG. 6, the power supply comprises a full-bridge inverter including a first bridge and a second bridge. A first switch 14 and a second switch 15 are series coupled to constitute the first bridge which is coupled between the input signal $V_{IN}$ and the ground. A third switch 16 and a fourth switch 17 are series coupled to constitute the second bridge which is coupled between the input power $V_{IN}$ and the ground, too. The equivalent circuit model of DC brushless motor has a first terminal A and a second terminal B, wherein the first terminal A is coupled to the conjunction of the first switch 14 and the second switch 15, and the second terminal B is coupled to the conjunction of the third switch 16 and the fourth switch 17. When the first switch 14 and the fourth switch 17 are turned ON, and the second switch 15 and the third switch 16 are turned OFF, a current is flowing in the direction shown (dashed line) in FIG. 6. The voltage across the first switch 14 and the fourth switch 17 is low and could be ignored, thus the voltage $V_{AB}$ between the first terminal A and the second terminal B is equal to the input signal $V_{IN}$. When the rotor 102 rotates close to the aligned position, the sense signal Vsense decreases, so does the variation rate dB/dt of the flux density and the induced electromotive force Vt. As a result, the voltage $V_{Lp}$ across the equivalently parasitical inductor Lp and the equivalently resistor Rp increases. Correspondingly, the current $I_{Lp}$ flowing through the equivalently parasitical inductor Lp increases. When the rotor 102 is in the aligned position, the variation rate dB/dt of the flux density decreases to zero, and the current $I_{Lp}$ flowing through the equivalently parasitical inductor Lp rises to a maximum value, thus there will be a current spike in the current $I_{Lp}$, as shown in FIG. 7.

To keep the rotor 102 rotating with fixed direction, the direction of the current of the coil 102 should be changed after the rotor 102 passes the aligned position. At the moment when the rotor 102 is at the aligned position, the second switch 15 and the third switch 16 are turned ON, and the first switch 14 and the fourth switch 17 are turned OFF. Because the current of the inductor could not change instantaneously, the direction of the current $I_{Lp}$ maintains for a short period of time, and the current $I_{Lp}$ passes through the second switch 15, the equivalently parasitical inductor Lp, the equivalently resistor Rp, and the induced electromotive force Vt, and the third switch 16, and back to the input power $V_{IN}$. The backflow current to the $V_{IN}$ causes voltage spike upon the input capacitor $C_{IN}$ (not shown in FIG. 6), shown in waveform $V_{CIN}$ in FIG. 7.

From the above description, the changing of the direction of the current flowing through the coil when the rotor is in the aligned position causes a current spike and a voltage spike. The present disclosure provides a control strategy for DC brushless motor driver to decrease the current and voltage spikes.

SUMMARY

It is an object of the present disclosure to provide a control strategy for DC brushless motor to decrease the voltage and current spikes.

In accomplishing the above and other objects, there has been provided, in accordance with an embodiment of the present disclosure, a DC brushless motor system, comprising: a power supply circuit having a first input terminal, a second input terminal, a third input terminal, a first output terminal and a second output terminal, wherein the first input terminal is configured to receive an input signal, the second input terminal is configured to receive a first control signal, the third input terminal is configured to receive a second control signal, and wherein based on the input signal, the first control signal and the second control signal, the power supply circuit provides a first output signal at the first output terminal and a second output signal at the second output terminal; a DC brushless motor having a first terminal coupled to the first output terminal of the power supply circuit to receive the first output signal and a second terminal coupled to the second output terminal of the power supply circuit to receive the second output terminal, and wherein the motor comprises a rotor and a coil, wherein the coil has two terminals respectively coupled to the first terminal and the second terminal, and wherein the motor runs based on a current flowing through the coil; a position sensor configured to sense the position of the rotor and to generate a sense signal indicative of the position of the rotor; and a control circuit having a first input terminal, a second input terminal, a first output terminal and a second output terminal, wherein the first input terminal is coupled to the position sensor to receive the sense signal, the second input terminal is configured to receive a sample signal indicative of the current flowing through the coil, and wherein based on the sense signal and the sample signal, the control circuit generates the first control signal at the first output terminal and the second control signal at the second output terminal; and wherein the control circuit decreases a peak current limit of the current flowing through the coil when the sense signal indicates the rotor is close to an aligned position.

In accomplishing the above and other objects, there has been provided, in accordance with another embodiment of the present disclosure, a DC brushless motor system comprising: a power supply circuit having a first input terminal, a second input terminal, a third input terminal, a first output terminal and a second output terminal, wherein the first input terminal is configured to receive an input signal, the second input terminal is configured to receive a first control signal, the third input terminal is configured to receive a second control signal, and wherein based on the input signal, the first control signal and the second control signal, the power supply circuit provides a first output signal at the first output terminal and a second output signal at the second output terminal; a DC brushless motor having a first terminal coupled to the second output terminal of the power supply circuit to receive the first output signal and a second terminal coupled to the second output terminal of the power supply circuit to receive the second output terminal, and wherein the motor comprises a rotor and a coil, and the coil has two terminals respectively coupled to the first terminal and the second terminal, and wherein the motor runs based on a current flowing through the coil; a hall sensor configured to sense the position of the rotor, and generate a pair of differential hall signals indicative of the position of the rotor; and a control circuit having a first input terminal, a second input terminal, a third input terminal, a first output terminal and a second output terminal, wherein the first input terminal and the third input terminal are coupled to the hall sensor to receive the pair of differential hall signals, the second input terminal is configured to receive a sample signal indicative of the current flowing through the coil, and wherein based on the pair of the differential hall signals, the control circuit decreases a peak current limit when the rotor is close to an aligned position and generates the first control signal at the first output terminal and the second control signal at the second output terminal.

In addition, there has been provided, in accordance with an embodiment of the present disclosure, a method used in a DC brushless motor system comprising: supplying an alternating current to a coil of a motor to drive the motor; determining whether a rotor of the motor is close to an aligned position by detecting a rotation angle of the rotor by a position sensor; decreasing a peak current limit of the coil current from a predetermined value when the rotor of the motor is close to the aligned position; and maintaining the peak current limit of the coil current when the rotor of the motor is far from the aligned position.

These and other features of the present disclosure will be readily apparent to persons of ordinary skill in the art upon reading the entirety of this disclosure, which includes the accompanying drawings and claims.

BRIEF DESCRIPTION OF THE DRAWINGS

FIG. 3 schematically shows the prior art DC brushless motor with a position sensor sensing the position of the rotor.

FIG. 4 shows the relationship of the sense signal and the position of the rotor.

The use of the same reference label in different drawings indicates the same of like components.

DETAILED DESCRIPTION

In the present disclosure, numerous specific details are provided, such as examples of circuits, components, and methods, to provide a thorough understanding of embodiments of the disclosure. Persons of ordinary skill in the art will recognize, however, that the disclosure can be practiced without one or more of the specific details. In other instances, well-known details are not shown or described to avoid obscuring aspects of the disclosure.

Figure 8:
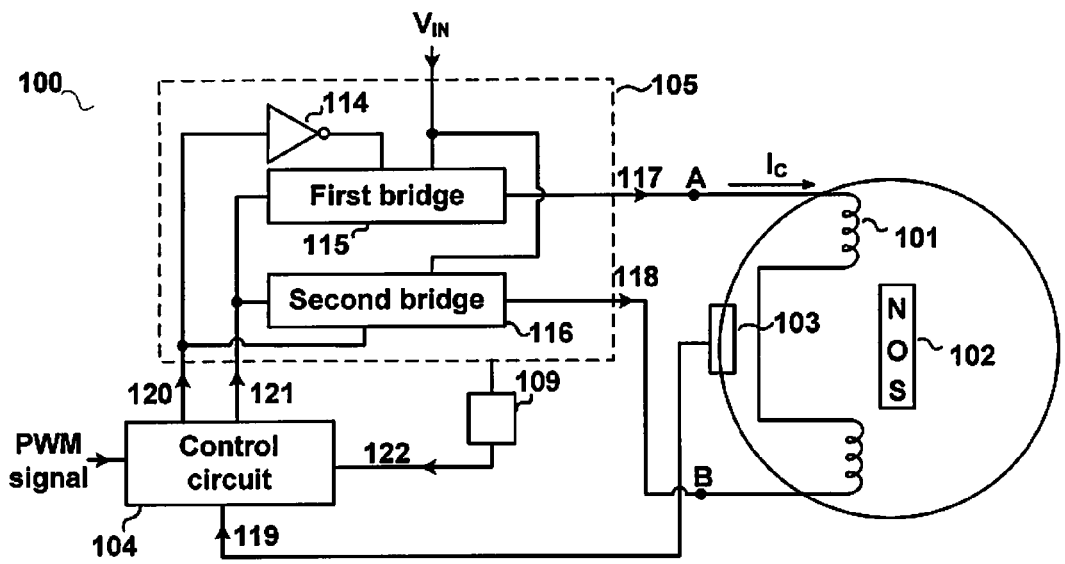
FIG. 8 shows a DC brushless motor system 100 in accordance with an embodiment of the present disclosure.

FIG. 8 shows a DC brushless motor system 100 in accordance with an embodiment of the present disclosure. The DC brushless motor system 100 comprises: a power supply circuit 105 having a first input terminal, a second input terminal, a third input terminal, a first output terminal and a second output terminal, wherein the first input terminal is configured to receive an input signal $V_{IN}$, the second input terminal is configured to receive a first control signal 120, the third input terminal is configured to receive a second control signal 121, and wherein based on the input signal $V_{IN}$, the first control signal 120 and the second control signal 121, the power supply circuit 105 provides a first output signal 117 at the first output terminal and a second output signal 118 at the second output terminal; a DC brushless motor having a first terminal "A" coupled to the first output terminal of the power supply circuit 105 to receive the first output signal 117 and a second terminal "B" coupled to the second output terminal of the power supply circuit 105 to receive the second output terminal 118, and wherein the motor comprises a rotor 102 and a coil 101, and the coil 101 has two terminals respectively coupled to the first terminal "A" and the second terminal "B", and wherein the motor 102 runs based on a current flowing through the coil 101; a position sensor 103 configured to sense the position of the rotor 102 and generate a sense signal 119 indicative of the position of the rotor 102; and a control circuit 104 having a first input terminal, a second input terminal, a first output terminal and a second output terminal, wherein the first input terminal is coupled to the position sensor 103 to receive the sense signal 119, the second input terminal is configured to receive a sample signal 122 indicative of the current flowing through the coil 101, and wherein based on the sense signal 119, and the sample signal 122, the control circuit 104 generates the first control signal 120 at the first output terminal and the second control signal 121 at the second output terminal; and wherein the control circuit 104 decreases a peak current limit of the current flowing through the coil 101 when the sense signal 119 indicates the rotor 102 is close to an aligned position.

Persons of ordinary skill in the art should know that the aligned position is where a magnetic pole of the rotor 102 is aligned to a magnetic pole of the coil 101. In one embodiment, the rotor 102 is close to an aligned position means the angle between the magnetic pole of the rotor 102 and the magnetic pole of the coil 101 is less than 10°.

In one embodiment, the DC brushless motor system 100 further comprises a current sample circuit 109 configured to sense the current of the coil 101, and to generate the sample signal 122 indicative of the current flowing through the coil 101 to the control circuit 104.

In one embodiment, the rotor 102 comprises a bar permanent magnet.

In one embodiment, the power supply circuit 105 comprises a full-bridge inverter, wherein the full bridge inverter comprises a first bridge 115 and a second bridge 116. The first bridge 115 is coupled to the first terminal "A" of the DC brushless motor, the second bridge 116 is coupled to the second terminal "B" of the DC brushless motor. The power supply circuit 105 is configured to provide current to the coil 101. Thus an electromagnetic field around the electrified coil 101 will generate torque upon the rotor 102.

In one embodiment, the position sensor 103 generates the sense signal 119 according to the position of the rotor 102, and provides the sense signal 119 to the control circuit 104. The control circuit 104 controls the operation of the power supply circuit 105 to control the current flowing through the coil 101. When the rotor 102 is close to the aligned position, the sense signal decreases, resulting in the decrease of the peak current limit of the current flowing through the coil 101. Because the peak current limit of the current flowing through the coil 101 decreases before the rotor 102 is in the aligned position, the current spike of the coil 101 decreases, so does the voltage spike upon an input capacitor $C_{IN}$ (not shown in FIG. 8) coupled to the first input terminal of the power supply 105.

Figure 9:
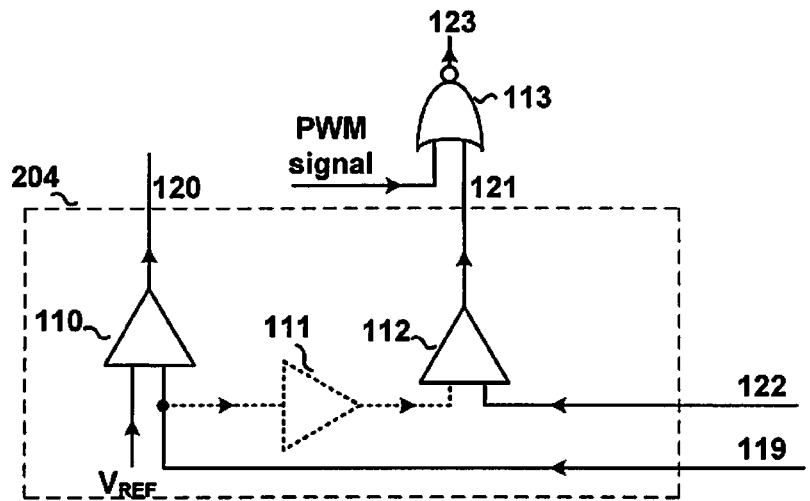
FIG. 9 shows a control circuit 204 in accordance with an embodiment of the present disclosure.
Figure 10:
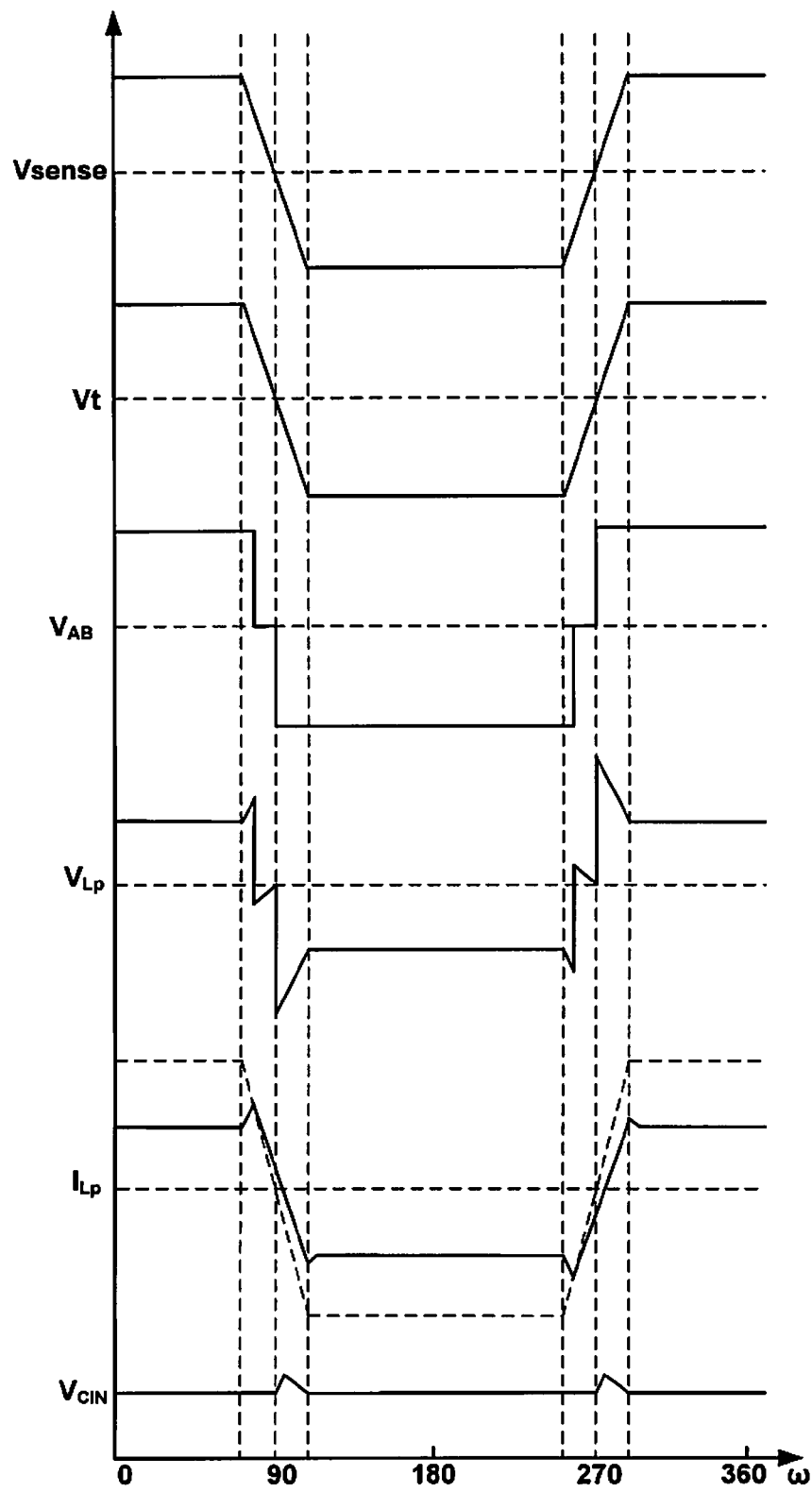
FIG. 10 shows the waveforms of the DC brushless motor system 100.

The decrease of the current spike and the voltage spike is described in detail with referring to FIGS. 9 and 10.

FIG. 9 shows the control circuit 204 in accordance with an embodiment of the present disclosure. In one embodiment, the control circuit 204 comprises: a first comparator 110 having a first input terminal, a second input terminal and an output terminal, wherein the first input terminal is configured to receive the sense signal 119 and the second input terminal is configured to receive a reference signal $V_{REF}$, and wherein based on the sense signal 119 and the reference signal $V_{REF}$, the first comparator generates a first control signal 120 at the output terminal; and a second comparator 112 having a first input terminal, a second input terminal and an output terminal, wherein the first input terminal is configured to receive the sense signal 119 and the second input terminal is configured to receive the sample signal 122 indicative of the current flowing through the coil 101, and wherein based on the sense signal 119 and the sample signal 122, the second comparator 112 generates a second control signal 121 at the output terminal.

In one embodiment, the control circuit 204 comprises: a first comparator 110 having a first input terminal, a second input terminal and an output terminal, wherein the first input terminal is configured to receive the sense signal 119 and the second input terminal is configured to receive a reference signal $V_{REF}$, and wherein based on the sense signal 119 and the reference signal $V_{REF}$, the first comparator 110 generates a first control signal 120 at the output terminal; an amplifier 111 configured to receive the sense signal 119, wherein based on the sensed signal 119, the amplifier generates an amplified sense signal; a second comparator 112 having a first input terminal and a second input terminal and an output terminal, wherein the first input terminal is configured to receive the amplified sense signal and the second input terminal is configured to receive the sample signal 122 indicative of the current of the coil, and wherein based on the amplified sense signal and the sample signal 122, the second comparator generates a second control signal 121 at the output terminal.

Persons of ordinary skill in the art should know that the amplified 111 is configured to make the sense signal have a suitable level with the sample signal. So in some embodiments, the amplifier 111 may be omitted. When the amplifier 111 is configured, a peak current limit is proportional to the sense signal. When the amplifier 111 is omitted, the sense signal is used as the peak current limit.

Figure 1:
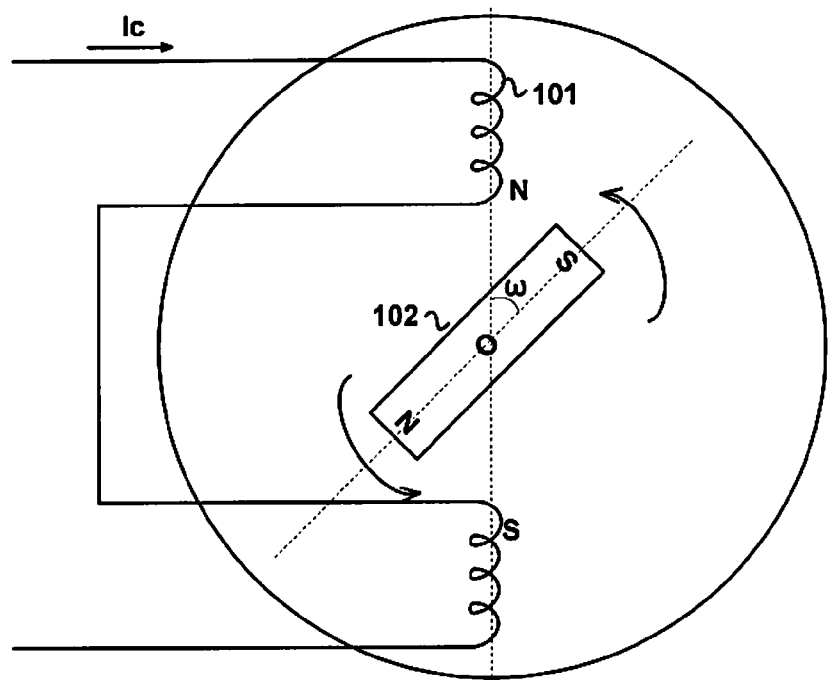
FIG. 1 shows the structure of a prior art DC brushless motor.
Figure 2:
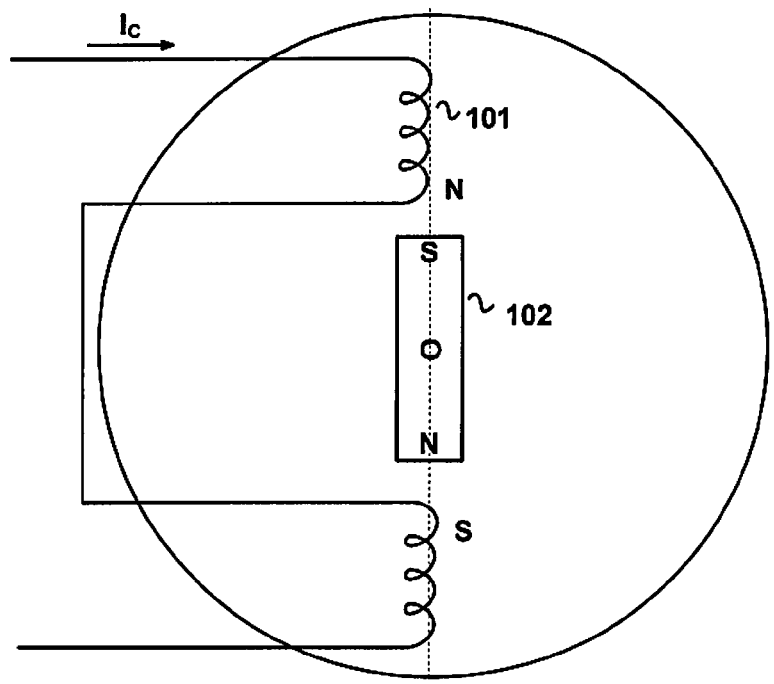
FIG. 2 schematically shows the motor in FIG. 1 with its rotor in an aligned position.
Figure 5:
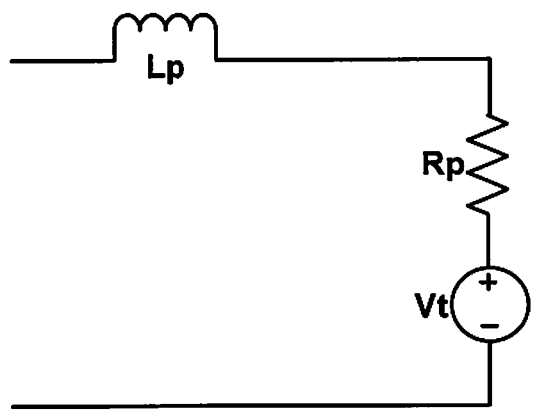
FIG. 5 schematically shows an equivalent circuit model of the DC brushless motor.
Figure 6:
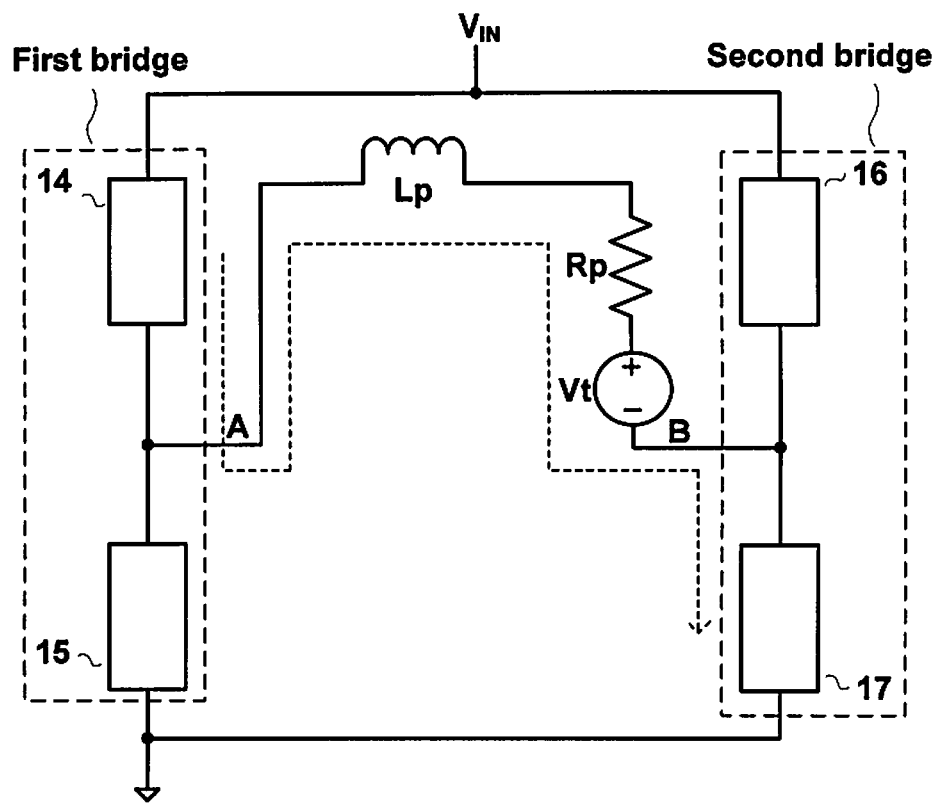
FIG. 6 shows a prior art equivalent circuit model of the DC brushless motor driven by a full-bridge inverter.
Figure 7:
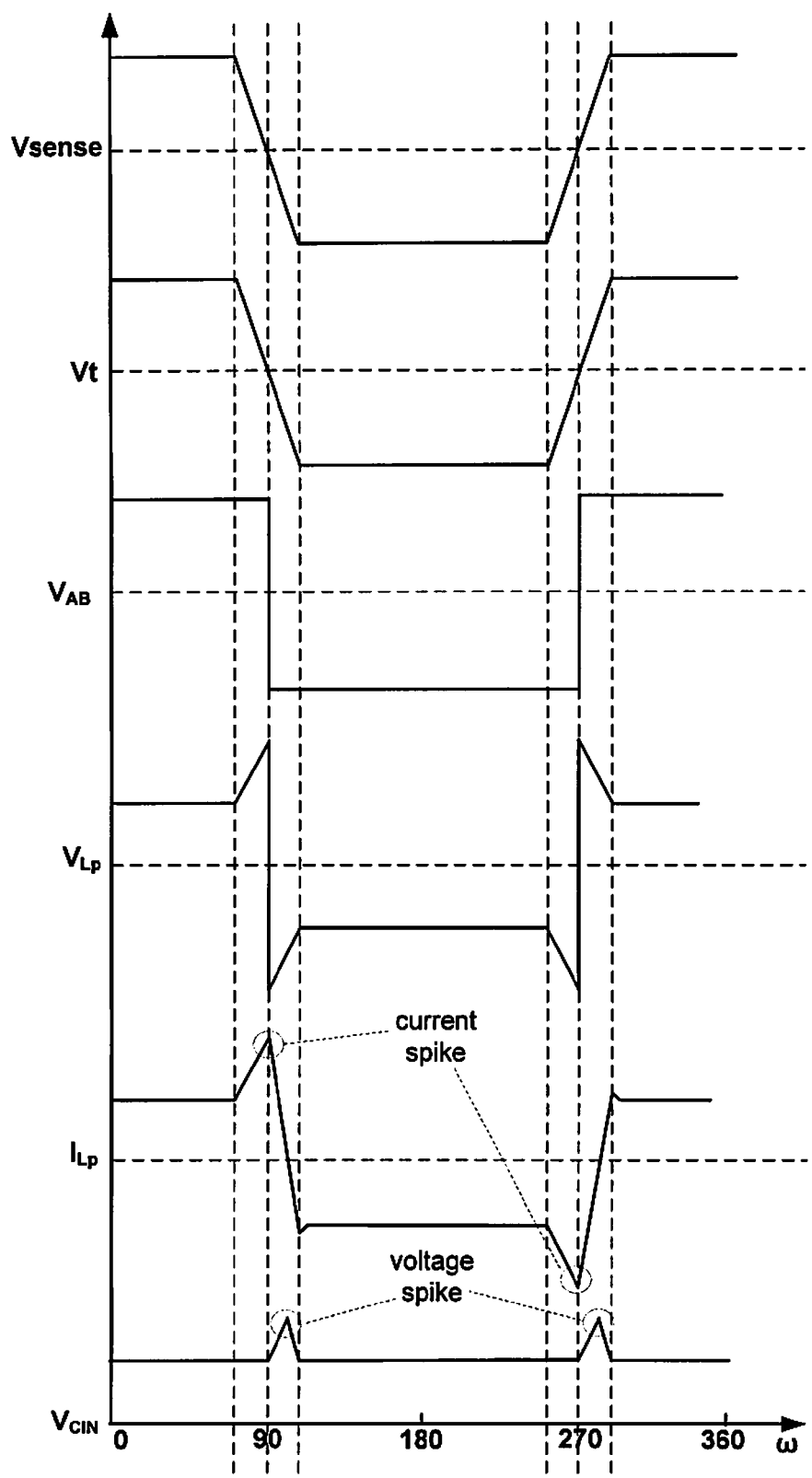
FIG. 7 shows the waveforms of a prior art DC brushless motor system.

The power supply circuit 105 is controlled to supply current to the coil 101. FIG. 10 shows the waveforms of the DC brushless motor system 100. The DC brushless motor in FIG. 9 could be replaced by the equivalent circuit model in FIG. 5. As seen from FIG. 10, when ω is far from 90° or 270°, which means the rotor 102 is far from the aligned position, the motor is in a steady state, the sense signal Vsense, the voltage $V_{Lp}$ across the equivalently parasitical inductor Lp and the equivalently resistor Rp, the current $I_{Lp}$ flowing through the equivalently parasitical inductor Lp and the voltage $V_{CIN}$ across the input capacitor $C_{IN}$ are stable. When w is approaching 90°, which means the rotor 102 is close to the aligned position and the motor is in a transient state, the variation rate dB/dt of the flux density and the sense signal Vsense decrease, so does and the induced electromotive force Vt. Thus, the voltage $V_{Lp}$ across the equivalently parasitical inductor Lp and the equivalently resistor Rp increases since the voltage $V_{AB}$ is fixed to $V_{IN}$. Correspondingly, the current $I_{Lp}$ of the equivalently parasitical inductor Lp increases. So the sample signal 122 indicative of the current flowing through the coil 101 increases. The sense signal 119 is used as the peak current limit of the current flowing through the coil 101. When the sample signal 122 is larger than the sense signal 119, the second comparison signal 121 provided by the second comparator 112 changes, and the power supply circuit 105 is turned OFF by the second comparison signal 121. At this moment, the voltage $V_{AB}$ across the equivalent circuit model reduces to zero, and the current flowing through the coil 101 decreases, as shown in FIG. 10. After the rotor 102 passes the aligned position, the power supply circuit 105 is controlled to provide a reversed voltage $-V_{IN}$ upon the equivalent circuit model, which means $V_{AB}=-V_{IN}$. So the current of the coil 101 inversely increases after it reduced to zero. When the flux density increases to steady state value, the motor system is in a steady state. When ω is between 90° and 270°, the sense signal is logical low. When ω is approaching 270°, which means the rotor 102 is close to the aligned position again, the sense signal Vsense increases. The variation rate dB/dt of the flux density decreases, so does and the induced electromotive force Vt. Thus, the voltage $V_{Lp}$ across the equivalently parasitical inductor Lp and the equivalently resistor Rp decreases since the voltage $V_{AB}$ is fixed to $-V_{IN}$. Correspondingly, the current $I_{Lp}$ of the equivalently parasitical inductor Lp decreases. So the sample signal 122 indicative of the current flowing through the coil 101 decreases. The sense signal 119 is used as a peak current limit of the current flowing through the coil 101. When the sample signal 122 is lower than the sense signal 119, the second comparison signal 121 provided by the second comparator 112 changes, and the power supply circuit 105 is turned OFF by the second comparison signal 121. At this moment, the voltage $V_{AB}$ across the equivalent circuit model increases to zero, and the current Ic flowing through the coil 101 increases, as shown in FIG. 10. After the rotor 102 passes the aligned position, the power supply circuit 105 is controlled to provide the voltage $V_{IN}$ upon the equivalent circuit model, which means $V_{AB}W_{IN}$. So the current of the coil 101 Ic increases. When the flux density increases to steady state value, the motor system is in a steady state. When w is approaching 90° the process repeats.

It can be concluded from the above description that: in transient state, the sense signal 119 which is used as the peak current limit of the current flowing through the coil 101 decreases. The decreased peak current limit reduces the current spike in the coil 101 when the rotor 102 is close to the aligned position. Because the power supply circuit 105 is turned OFF when the rotor is close to the aligned position, the backflow current to the $V_{IN}$ decreases, so does the voltage spike in the input capacitor $C_{IN}$.

In one embodiment, the control circuit 104 further comprises a logic circuit 113 having a first input terminal, a second input terminal and an output terminal, wherein the first input terminal is configured to receive a PWM (pulse width modulation) signal, the second input terminal is configured to receive the second control signal 121, and wherein based on the PWM signal and the second control signal 121, the logic circuit 113 generates a logic signal 123 instead of the second control signal 121 to control the power supply circuit 105.

In one embodiment, the logic circuit comprises a NOR gate.

Persons of ordinary skill in the art should know that the PWM signal is a train of pulses used to regulate the speed of the motor. The PWM signal is configured to control the switching of the power supply circuit 105, thus regulate the current supplied to the motor to regulate the speed of the motor.

The power supply circuit 105 may comprise a full-bridge inverter or a half-bridge inverter. The operation of the full-bridge inverter and the half-bridge inverter is familiar to the person with ordinary skill in the art, and is not described here for brevity.

Figure 11:
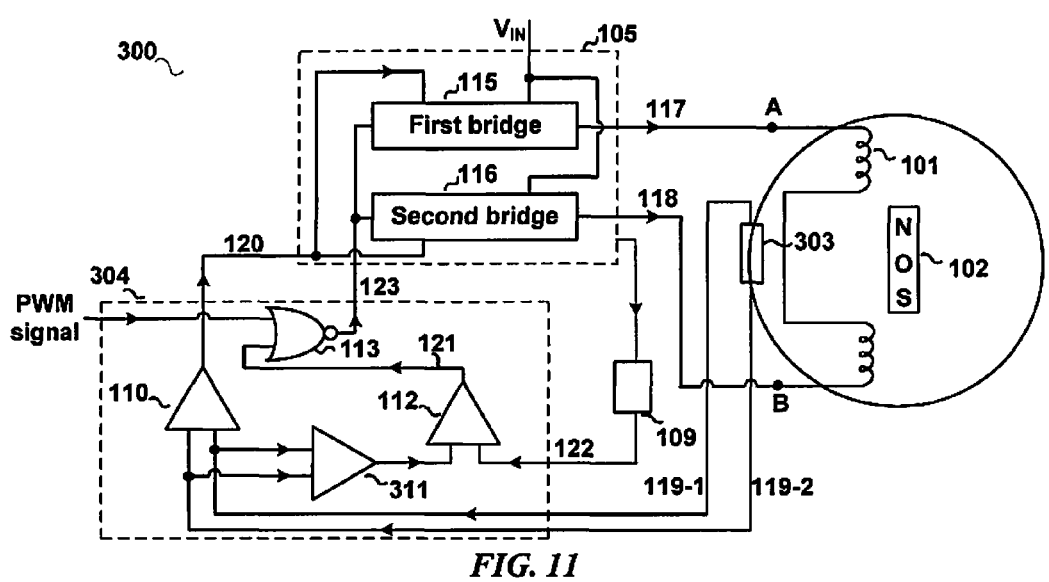
FIG. 11 schematically shows a DC brushless motor system 300 in accordance with an embodiment of the present disclosure.

FIG. 11 shows a DC brushless motor system 300 in accordance with an embodiment of the present disclosure. The motor system 300 comprises: a power supply circuit 105 having a first input terminal, a second input terminal, a third input terminal, a first output terminal and a second output terminal, wherein the first input terminal is configured to receive an input signal $V_{IN}$, the second input terminal is configured to receive a first control signal 120, the third input terminal is configured to receive a second control signal 121, and wherein based on the input signal $V_{IN}$, the first control signal 120 and the second control signal 121, the power supply circuit 105 provides a first output signal 117 at the first output terminal and a second output signal 118 at the second output terminal; a DC brushless motor having a first terminal "A" coupled to the first output terminal of the power supply circuit 105 to receive the first output signal 117 and a second terminal "B" coupled to the second output terminal of the power supply circuit 105 to receive the second output signal 118, and wherein the motor comprises a rotor 102 and a coil 101, and the coil 101 has two terminals respectively coupled to the first terminal "A" and the second terminal "B", and wherein the motor 102 rotates based on a current flowing through the coil 101; a hall sensor 303 configured to sense the position of the rotor 102, and generate a pair of differential hall signals 119-1 and 119-2 indicative of the position of the rotor; and a control circuit 304 having a first input terminal, a second input terminal, a third input terminal, a first output terminal and a second output terminal, wherein the first input terminal and the third input terminal are coupled to the hall sensor 303 to receive the pair of differential hall signals 119-1 and 119-2, the second input terminal is configured to receive a sample signal 122 indicative of the current flowing through the coil 101, and wherein based on the pair of the differential hall signals 119-1 and 119-2, and the sample signal 122, the control circuit 304 generates the first control signal 120 at the first output terminal and the second control signal 121 at the second output terminal; and wherein the control circuit 304 decreases a peak current limit of the current flowing through the coil when the pair of the differential hall signals 119-1 and 119-2 indicate the rotor 102 is close to an aligned position.

Persons of ordinary skill in the art should know that the aligned position is where the magnetic pole of the rotor 102 is aligned to the magnetic pole of the coil 101.

In one embodiment, the DC brushless motor system 300 further comprises a current sample circuit 109 configured to sense the current flowing through the coil 101, and to generate the sample signal 122 indicative of the current of the coil 101 to the control circuit 304.

In one embodiment, the rotor 102 comprises a bar permanent magnet.

The operations of the power supply circuit 105 and the DC brushless motor are described before, and are not described here for brevity.

In one embodiment, the hall sensor 303 generates the pair of the differential hall signals 119-1 and 119-2 in response to the position of the rotor 102, and provides the said pair of the differential hall signals 119-1 and 119-2 to the control circuit 304. The control circuit 304 controls the operation of the power supply circuit 105 to control the current flowing through the coil 101. When the rotor 102 is close to the aligned position, the sense signal decreases, resulting in the decrease of the peak current limit of the current flowing through the coil 101. Because the peak current limit of the current in the coil 101 decreases before the rotor 102 is in the aligned position, the current spike of the coil 101 decreases, so does the voltage spike upon an input capacitor $C_{IN}$ (not shown in FIG. 11) coupled to the first input terminal of the power supply 105.

In one embodiment, the control circuit 304 comprises: a first comparator 110 having a first input terminal, a second input terminal and an output terminal, wherein the first input terminal and the second input terminal are configured to receive the pair of the differential hall signals 119-1 and 119-2, and wherein based on the differential hall signals 119-1 and 119-2, the first comparator 110 generates a first control signal 120 at the output terminal; an amplifier 311 configured to amplify the difference between the differential hall signals 119-1 and 119-2, wherein based on the differential hall signals 119-1 and 119-2, the amplifier 311 generates an amplified hall signal; and a second comparator 122 having a first input terminal and a second input terminal and an output terminal, wherein the first input terminal is configured to receive the amplified hall signal and the second input terminal is configured to receive the sample signal 122 indicative of the current of the coil, and wherein based on the amplified hall signal and the sample signal 122, the second comparator 112 generates a second control signal 121 at the output terminal.

In one embodiment, the control circuit 304 further comprises a logic circuit 113 having a first input terminal, a second input terminal and an output terminal, wherein the first input terminal is configured to receive a PWM signal and the second input terminal is configured to receive the second control signal 121, and wherein based on the PWM signal and the second control signal 121, the logic circuit 113 generates a logic signal 123 instead of the second control signal 121 to coupled to the power supply circuit 105.

The operation of the motor system 300 is similar to the operation of the motor system 100, and is not described here for brevity.

Figure 12:
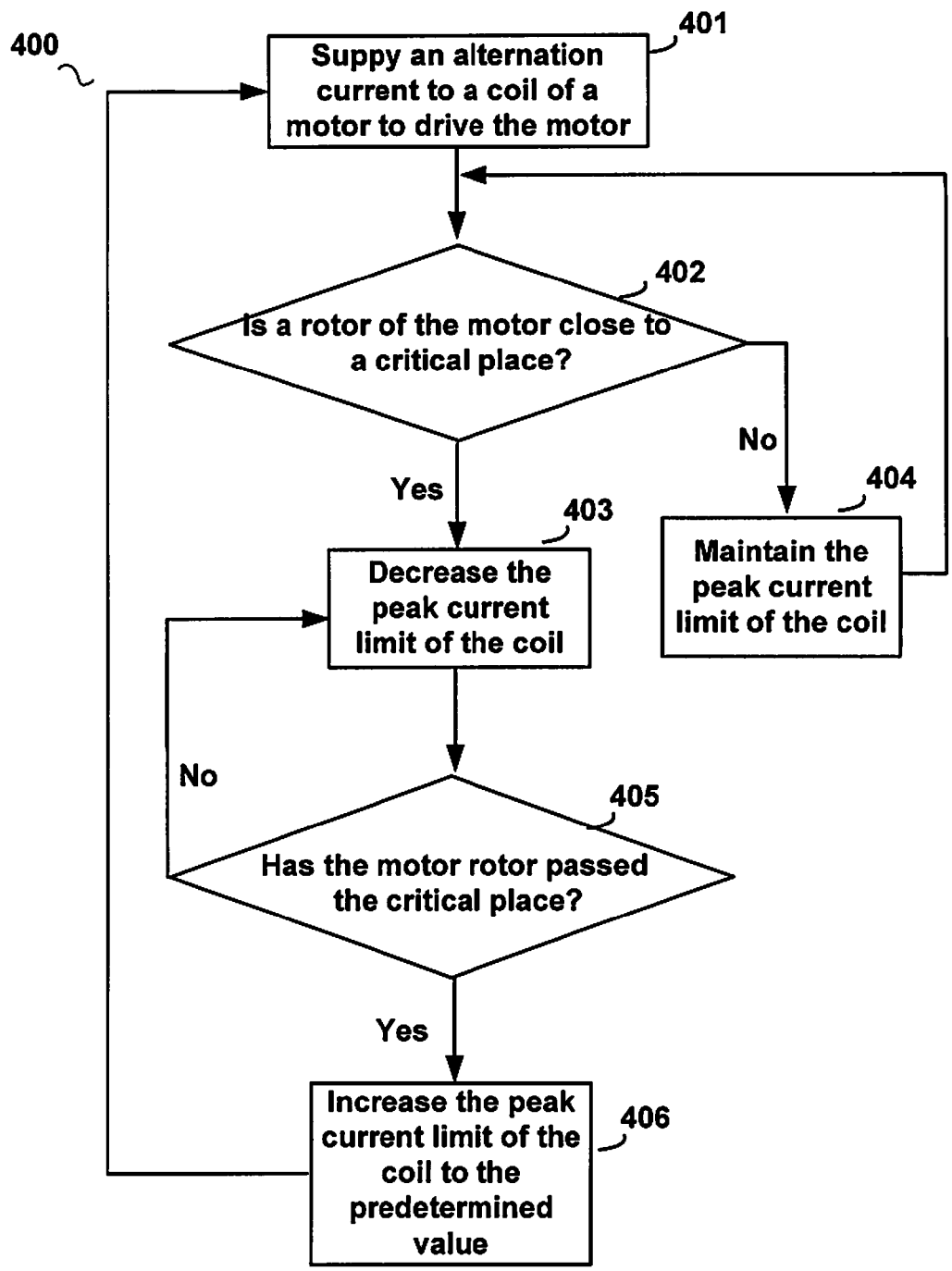
FIG. 12 shows an equivalent circuit model of a DC brushless motor system 300 in accordance with an embodiment of the present disclosure.

FIG. 12 shows a flowchart of a method 400 for controlling a DC brushless motor in accordance with an embodiment of the present invention. The method comprises: step 401, supplying an alternating current to a coil of a motor to drive the motor; step 402, judging whether a rotor of the motor is close to an aligned position by detecting a rotation angle of the rotor by a position sensor; step 403, decreasing a peak current limit of the coil current from a predetermined value when the rotor of the motor is close to the aligned position; and step 404, maintaining the peak current limit of the coil current when the rotor of the motor is far from the aligned position.

In one embodiment, the aligned position is where the magnetic pole of the rotor is aligned to the magnetic pole of the coil.

In one embodiment, the method further comprises step 405, judging whether the motor rotor passes the aligned position; and step 406, increasing the peak current limit of the coil current to the predetermined value when the motor rotor has already passed the aligned position An effective technique for decreasing the current spike and voltage spike in the DC brushless motor system has been disclosed. While specific embodiments of the present disclosure have been provided, it is to be understood that these embodiments are for illustration purposes and not limiting. Many additional embodiments will be apparent to persons of ordinary skill in the art reading this disclosure.

We claim:
1. A DC brushless motor system, comprising:
a power supply circuit having a first input terminal, a second input terminal, a third input terminal, a first output terminal and a second output terminal, wherein the first input terminal is configured to receive an input signal, the second input terminal is configured to receive a first control signal, the third input terminal is configured to receive a second control signal, and wherein based on the input signal, the first control signal and the second control signal, the power supply circuit provides a first output signal at the first output terminal and a second output signal at the second output terminal;
a DC brushless motor having a first terminal coupled to the first output terminal of the power supply circuit to receive the first output signal and a second terminal coupled to the second output terminal of the power supply circuit to receive the second output terminal, and wherein the motor comprises a rotor and a coil, wherein the coil has two terminals respectively coupled to the first terminal and the second terminal, and wherein the motor runs based on a current flowing through the coil;
a position sensor configured to sense the position of the rotor and to generate a sense signal indicative of the position of the rotor; and
A control circuit, wherein the control circuit comprises: a logic circuit having a first input terminal, a second input terminal and an output terminal, wherein the first input terminal is configured to receive a PWM signal and the second input terminal is configured to receive the second control signal, and wherein based on the PWM signal and the second control signal, the logic circuit generates a logic signal instead of the second control signal to coupled to the control circuit;
wherein the logic circuit comprises a NOR gate;
an amplifier configured to receive the sense signal, wherein based on the sensed signal, the amplifier generates an amplified sense signal;
a first comparator having a first input terminal, a second input terminal and an output terminal, wherein the first input terminal is configured to receive the sense signal and the second input terminal is configured to receive a reference signal, and wherein based on the sense signal and the reference signal, the first comparator generates a first control signal at the output terminal;
a second comparator having a first input terminal and a second input terminal and an output terminal, wherein the first input terminal is configured to receive the sense signal and the second input terminal is configured to receive the sample signal indicative of the current of the coil, and wherein based on the sense signal and the sample signal, the second comparator generates a second control signal at the output terminal;
a control circuit having a first input terminal, a second input terminal, a first output terminal and a second output terminal, wherein the first input terminal is coupled to the position sensor to receive the sense signal, the second input terminal is configured to receive a sample signal indicative of the current flowing through the coil, and wherein based on the sense signal and the sample signal, the control circuit generates the first control signal at the first output terminal and the second control signal at the second output terminal; and wherein when the sense signal indicates the rotor is close to an aligned position, the control circuit decreases a peak current limit of the current flowing through the coil before the rotor reaches the aligned position.

2. The DC brushless motor system of claim 1 further comprises a current sample circuit configured to sense the current flowing through the coil, and to generate the sample signal indicative of the current flowing through the coil.

3. The DC brushless motor system of claim 1, wherein the aligned position is where the magnetic pole of the rotor is aligned to the magnetic pole of the coil.

4. The DC brushless motor driver of claim 1, wherein the power supply circuit comprises a full-bridge inverter.

5. The DC brushless motor driver of claim 1, wherein the power supply circuit comprises a half-bridge inverter.

6. A DC brushless motor system, comprising:
a power supply circuit having a first input terminal, a second input terminal, a third input terminal, a first output terminal and a second output terminal, wherein the first input terminal is configured to receive an input signal, the second input terminal is configured to receive a first control signal, the third input terminal is configured to receive a second control signal, and wherein based on the input signal, the first control signal and the second control signal, the power supply circuit provides a first output signal at the first output terminal and a second output signal at the second output terminal;
a DC brushless motor having a first terminal coupled to the second output terminal of the power supply circuit to receive the first output signal and a second terminal coupled to the second output terminal of the power supply circuit to receive the second output terminal, and wherein the motor comprises a rotor and a coil, and the coil has two terminals respectively coupled to the first terminal and the second terminal, and wherein the motor runs based on a current flowing through the coil;
a hall sensor configured to sense the position of the rotor, and generate a pair of differential hall signals indicative of the position of the rotor;
A control circuit, wherein the control circuit comprises: a logic circuit having a first input terminal, a second input terminal and an output terminal, wherein the first input terminal is configured to receive a PWM signal and the second input terminal is configured to receive the second control signal, and wherein based on the PWM signal and the second control signal, the logic circuit generates a logic signal to replace the second control signal, wherein the logic circuit comprises a NOR gate; a first comparator having a first input terminal, a second input terminal and an output terminal, wherein the first input terminal and the second input terminal are configured to receive the pair of the differential hall signals, and wherein based on the differential hall signals, the first comparator generates a first control signal at the output terminal;
an amplifier configured to amplify the difference between the differential hall signals, wherein based on the differential hall signals, the amplifier generates an amplified hall signal; and a second comparator having a first input terminal and a second input terminal and an output terminal, wherein the first input terminal is configured to receive the amplified hall signal and the second input terminal is configured to receive the sample signal indicative of the current of the coil, and wherein based on the sense signal and the sample signal, the second comparator generates a second control signal;
a control circuit having a first input terminal, a second input terminal, a third input terminal, a first output terminal and a second output terminal, wherein the first input terminal and the third input terminal are coupled to the hall sensor to receive the pair of differential hall signals, the second input terminal is configured to receive a sample signal indicative of the current flowing through the coil, and wherein based on the pair of the differential hall signals, the control circuit decreases a peak current limit before the rotor reaches an aligned position when the rotor is close to the aligned position and generates the first control signal at the first output terminal and the second control signal at the second output terminal.

7. The DC brushless motor system of claim 6 further comprises a current sample circuit configured to sample the current of the coil, and to generate the sample signal indicative of the current of the coil.

8. The DC brushless motor system of claim 6, wherein the aligned position is where the magnetic pole of the rotor is aligned to the magnetic pole of the coil.

9. The DC brushless motor driver of claim 6, wherein the power supply circuit comprises a full-bridge inverter.

10. The DC brushless motor driver of claim 6, wherein the power supply circuit comprises a half-bridge inverter.

* * * * *